United States Patent
Li et al.

(10) Patent No.: US 8,683,027 B2
(45) Date of Patent: Mar. 25, 2014

(54) UTILIZATION OF UNCERTAINTY DEPENDENCY RELATIONSHIPS BETWEEN ITEMS IN A DATA STREAM

(75) Inventors: Nina Li, Ontario (CA); James D Spyker, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 101 days.

(21) Appl. No.: 13/156,247

(22) Filed: Jun. 8, 2011

(65) Prior Publication Data
US 2012/0317255 A1    Dec. 13, 2012

(51) Int. Cl.
*G06F 15/173* (2006.01)
*G06F 15/16* (2006.01)

(52) U.S. Cl.
USPC .......................................... 709/223; 709/218

(58) Field of Classification Search
USPC ....................................................... 709/223
See application file for complete search history.

(56) References Cited

U.S. PATENT DOCUMENTS

| | | | |
|---|---|---|---|
| 6,112,173 A | 8/2000 | Hirayama | |
| 6,167,438 A * | 12/2000 | Yates et al. | 709/216 |
| 6,430,527 B1 * | 8/2002 | Waters et al. | 703/3 |
| 6,480,876 B2 | 11/2002 | Rehg et al. | |
| 7,130,847 B2 * | 10/2006 | Waters et al. | 707/706 |
| 7,363,284 B1 | 4/2008 | Plasek et al. | |
| 7,826,365 B2 * | 11/2010 | Tang et al. | 370/235 |
| 2005/0283525 A1 * | 12/2005 | O'Neal et al. | 709/223 |
| 2006/0064424 A1 * | 3/2006 | Heuer et al. | 707/100 |
| 2009/0059923 A1 * | 3/2009 | Guo et al. | 370/390 |
| 2009/0135716 A1 * | 5/2009 | Veillette | 370/221 |
| 2009/0222472 A1 | 9/2009 | Aggarwal et al. | |
| 2010/0316122 A1 * | 12/2010 | Chen et al. | 375/240.12 |
| 2012/0117208 A1 * | 5/2012 | Shaffer et al. | 709/221 |
| 2012/0317255 A1 * | 12/2012 | Li et al. | 709/223 |

OTHER PUBLICATIONS

Yeh et al., "PROUD: A Probabilistic Approach to Processing Similarity Queries over Uncertain Data Streams", ACM.EDBT 2009, Mar. 24-26, 2009, 12 pages.
Lodha et al., "UFLOW: Visualizing Uncertainty in Fluid Flow", Proceedings of the 7th IEEE Visualization Conference (VIS'96), 1996, 7 pages.
Diao et al., "Capturing Data Uncertainty in High-Volume Stream Processing", 4th Biennial Conference on Innovative Data Systems Research (CIDR), Jan. 4-7, 2009, 11 pages.
Leung et al., "Efficient Mining of Frequent Patterns from Uncertain Data", ICDM-DUNE 2007, pp. 1-7.
Oates et al., "Searching for Structure in Multiple Streams of Data", 1996, 9 pages.

* cited by examiner

*Primary Examiner* — Gerald Smarth
(74) *Attorney, Agent, or Firm* — Terry J. Carroll; Edell, Shapiro & Finnan, LLC

(57) ABSTRACT

A computer-implemented method, computer program product and computer system for controlling processing of a data stream employing utilization of uncertainty dependency relationships, by receiving elements of data of a hierarchy to form received data, wherein each element has associated dependency information, creating a set of data streams, receiving elements, associated with a specific terminal node, from the received data into a respective data stream associated with the specific terminal node, processing data streams in the set of data streams individually using the associated dependency information, determining whether processing of a stream in the set of data streams is successful and, responsive to a determination that processing of each stream in the set of data streams is successful the computer-implemented process, terminating controlling processing.

20 Claims, 5 Drawing Sheets

Stream-processing system
300

US 8,683,027 B2

UTILIZATION OF UNCERTAINTY DEPENDENCY RELATIONSHIPS BETWEEN ITEMS IN A DATA STREAM

BACKGROUND

1. Technical Field

This invention relates generally to dependency relationships in a data stream of a data processing system and more specifically to utilization of uncertainty dependency relationships for controlling processing of the data stream in the data processing system.

2. Description of the Related Art

Dependency relationships between items in a data stream can be important for accurate processing of the data stream. In some cases the dependency relationships are known for certain, but in other cases the dependency may be a guess. Existing methods for dealing with uncertain relationships typically allow the simplest of relationships between items, for example, identifying one item is likely independent of another item.

Examples of processing uncertain data streams typically include pattern identification in which frequent or infrequent occurrences between identified patterns represent dependency relationships. Other examples further include transforming identified patterns by inference into dependent data of interest.

Having knowledge of more complex relationships can typically allow for more efficient processing of a data stream in examples where processing of dependent items in an incorrect order can be detected.

SUMMARY

According to embodiments of the invention, a computer-implemented method, a computer program product and a computer system is provided for controlling processing of a data stream employing utilization of uncertainty dependency relationships, by receiving elements of data of a hierarchy to form received data, wherein each element has associated dependency information, creating a set of data streams, receiving elements, associated with a specific terminal node, from the received data into a respective data stream associated with the specific terminal node, processing data streams in the set of data streams individually using the associated dependency information, determining whether processing of a stream in the set of data streams is successful and, responsive to a determination that processing of each stream in the set of data streams is successful the computer-implemented process, terminating controlling processing.

BRIEF DESCRIPTION OF THE SEVERAL VIEWS OF THE DRAWINGS

For a more complete understanding of this invention, reference is now made to the following brief description, taken in conjunction with the accompanying drawings and detailed description, wherein like reference numerals represent like parts.

DETAILED DESCRIPTION

Figure 1:
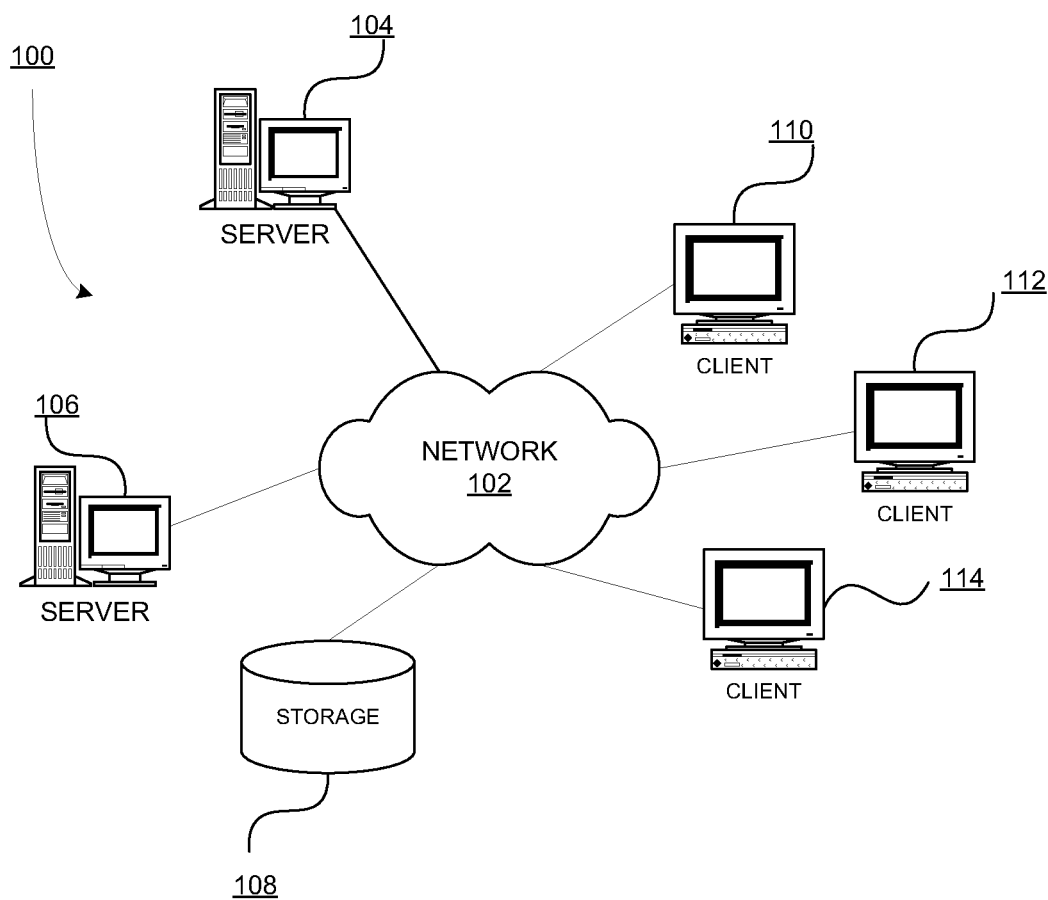
FIG. 1 is a pictorial representation of a network of data processing systems in which illustrative embodiments may be implemented.

Although an illustrative implementation of one or more embodiments is provided below, the disclosed systems and/or methods may be implemented using any number of techniques. This invention should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with the computer-readable program code embodied therein, for example, either in baseband or as part of a carrier wave. Such a propagated signal may take a variety of forms, including but not limited to electro-magnetic, optical or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, RF, etc. or any suitable combination of the foregoing.

Computer program code for carrying out operations for aspects of the present invention may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 2:
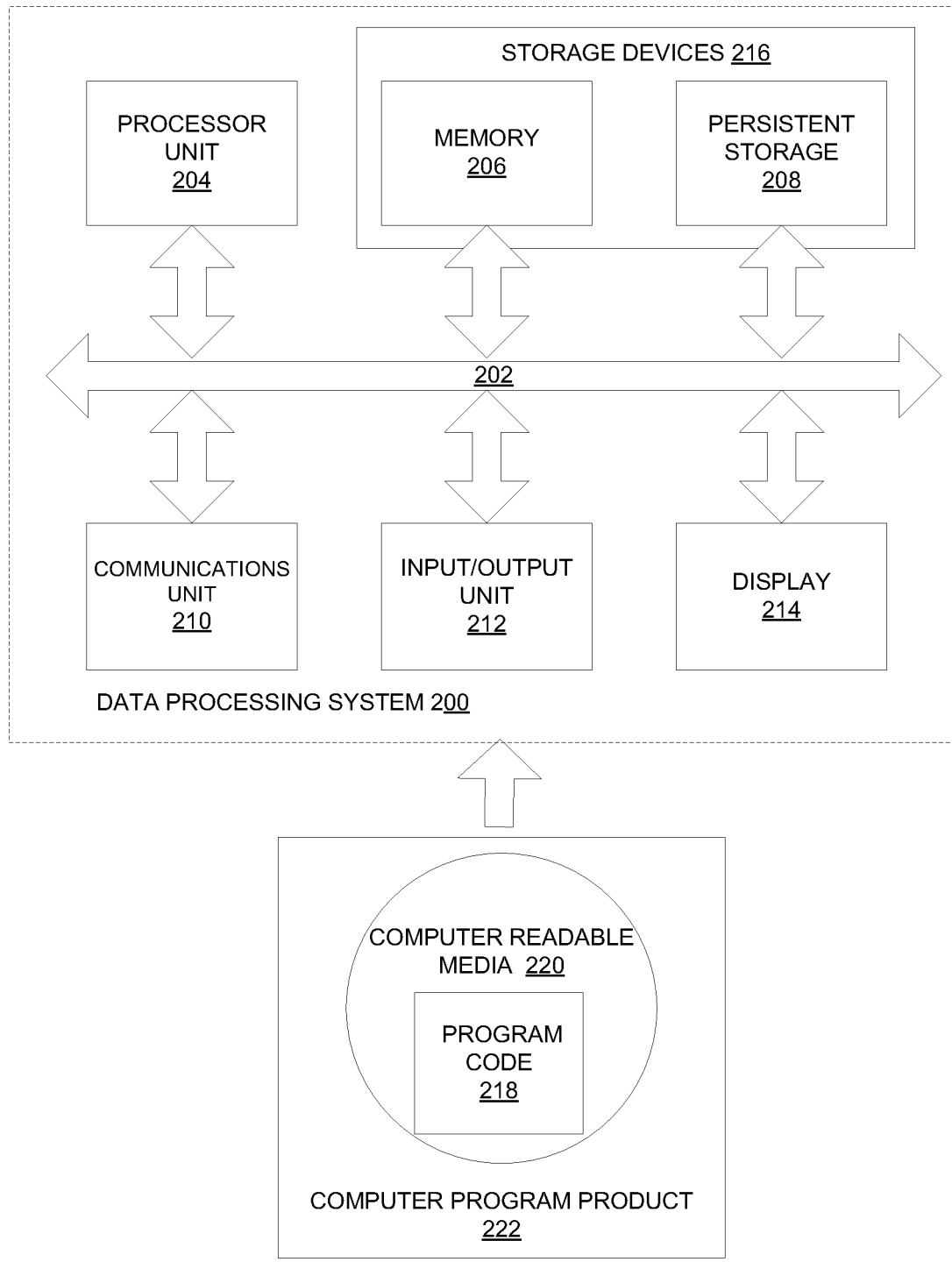
FIG. 2 is a block diagram of an exemplary data processing system operable for various embodiments of the invention.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to FIG. 2 a block diagram of an exemplary data processing system operable for various embodiments of the invention is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 220 also may take the form of a persistent storage, such as a hard drive, a thumb drive, or a flash memory that is connected to data processing system 200. The tangible form of computer readable media 220 is also referred to as a computer readable storage medium. In some instances, computer readable media 220 may not be removable.

Alternatively, program code 218 may be transferred to data processing system 200 from computer readable media 220 through a communications link to communications unit 210 and/or through a connection to input/output unit 212. The communications link and/or the connection may be physical or wireless in the illustrative examples. In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

Using data processing system 200 of FIG. 2 as an example, a computer-implemented process for controlling processing of a data stream employing utilization of uncertainty dependency relationships is presented. For example, a data stream employing utilization of uncertainty dependency relationships may be a data stream representing a set of query data flowing from storage devices 216 to communications unit 210 for transmission to an external user. Processor unit 204 receives elements of data of a hierarchy to form received data, wherein each element has associated dependency information. Processor unit 204 may be implemented for example, using server 106 and receive elements using network 102 of data processing 100 both of FIG. 1. Processor unit 204 creates a set of data streams, by receiving elements associated with a specific terminal node, from the received data into a respective data stream associated with the specific terminal node. Processor unit 204 processes data streams in the set of data streams individually using the associated dependency information, which may be stored in storage devices 216 and determines whether processing of a stream in the set of data streams is successful. Responsive to a determination processing of each stream, in the set of data streams, is successful having no dependency errors, processor 204 terminates controlling processing. Success is determined by an absence of dependency errors across streams in the set of data streams comprising a unit of work. Processing is stopped upon determining that one stream in the set of data streams reports a dependency error whereas more than one stream may report a dependency error.

In another example, a computer-implemented process, using program code 218 stored in memory 206 or as a computer program product 222, for controlling processing of a data stream employing utilization of uncertainty dependency relationships comprises a computer recordable storage media, such as computer readable media 220, containing computer executable program code stored thereon. The computer executable program code comprises computer executable program code for controlling processing of a data stream employing utilization of uncertainty dependency relationships.

Figure 3:
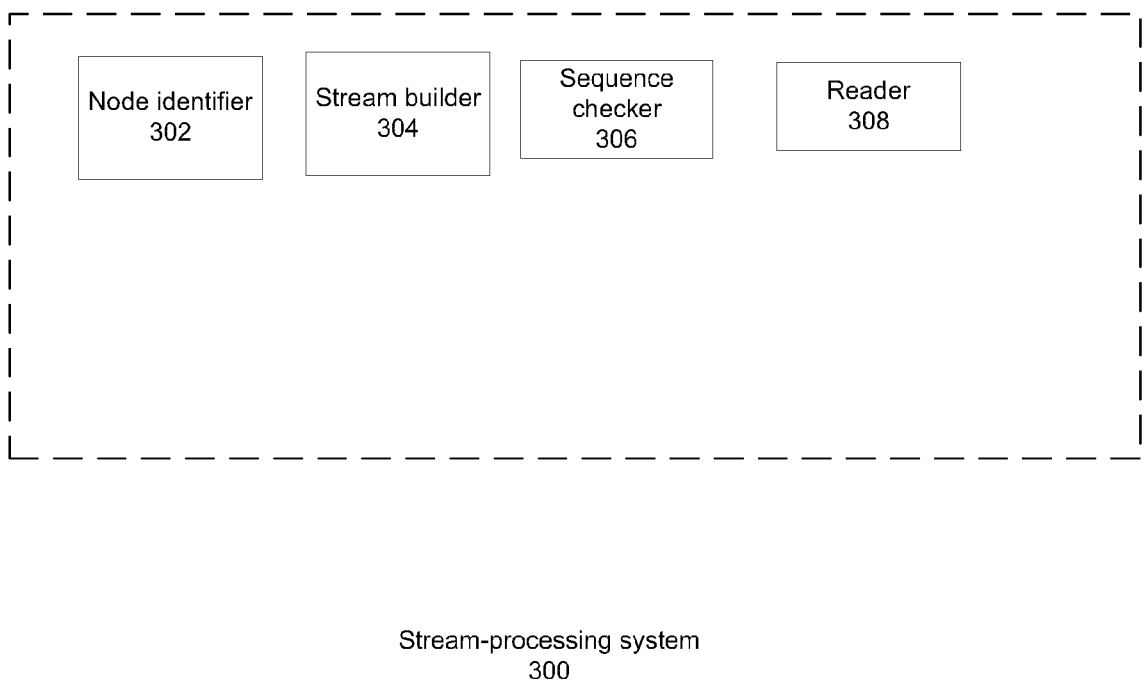
FIG. 3 is a block diagram of a stream processing system, in accordance with one embodiment of the invention.

With reference to FIG. 3, a block diagram of a stream processing system, in accordance with one embodiment of the invention is presented. Stream processing system 300 is an example of a data stream processing system in which uncertainty dependency relationships between items in the data stream are identified and utilized, in accordance with one embodiment of the invention.

Stream processing system 300 uses an underlying data processing system, such as data processing system 200 of FIG. 2, for typical processing capabilities and may be included in a network of data processing systems such as network data processing system 100 of FIG. 1. Stream processing system 300 contains a number of components including node identifier 302, stream builder 304, sequence checker 306 and reader 308.

Node identifier 302 provides a capability of identifying terminal nodes in a data stream input. For example, elements of a data stream separated into a number of sub-nodes and leaves comprising an order data structure of a balanced tree contain a number of terminal nodes. Terminal nodes having only children as leaves are identified as indicators of a process series comprising associated leaves or elements in the example. The term elements or items may be used interchangeably to refer to objects within the data stream.

Stream builder 304 provides a capability for creating a set of processing streams. A unique processing stream is created for each identified terminal node in a data stream input. Each processing stream comprises elements including a terminal node and associated leaves. Elements of an input stream are expected to be in proper original order for successful processing. Each processing stream is processed separately enabling parallel processing of a segmented data stream.

Sequence checker 306 provides a capability to determine whether element dependencies exist across input streams. A determination of an element being associated with an a dependency error represents an occurrence of an element of one input stream having a dependency relationship with an element of another input stream. The dependency detection is not a determination of the order within a given input stream; rather dependency detection involves identifying dependencies between parallel input streams. A dependency error determination results in a failed processing operation.

Sequence information is obtained using reader 308 to receive information associated with a data structure including an ordered data structure of a balanced tree. For example, when a database system is used to process transactions, foreign keys relationships may be used to determine a dependency between streams during processing.

Figure 4:
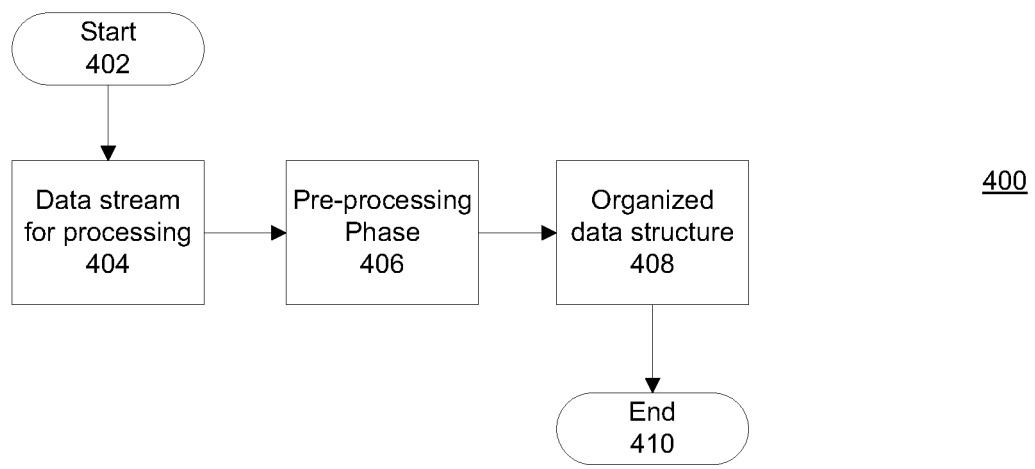
FIG. 4 is a flowchart of a pre-process used with the stream processing system of FIG. 3, in accordance with one embodiment of the invention.

With reference to FIG. 4, a flowchart of a pre-process used with the stream-processing system of FIG. 3, in accordance with one embodiment of the invention is presented. Process 400 is an example of a processing segment in which an organized data structure is created from a data stream input for use with stream processing system 300 of FIG. 3. In the example illustrative embodiment, process 400 creates an organized data structure in the form of an ordered tree from which dependency relationship information associated with elements of an input data stream may be obtained.

Process 400 starts (step 402) and receives a data stream for processing (step 404). The data stream for processing comprises a number of elements wherein an element has an associated uncertainty dependency relationship with some other element in the data stream. Dependency information associated with the elements is maintained implicitly (by relative position) or explicitly (for example, metadata, tags, or descriptors) or both.

The elements in a data stream flow through an optimization stage of pre-processing stage 406 before further processing is done. Pre-processing stage 406 places each of the items from the data stream for processing into organized data structure 408. For example, organized data structure 408 is an ordered tree structure, in which elements are nodes or leaves and all sub-nodes/leaves of a given node have a well-defined order. In the ordered tree structure a node may either have sub-nodes or leaves, but cannot contain a combination of sub-nodes and leaves. In one embodiment a created ordered tree may also be of a consistent depth; so all leaves exist at a same distance from the root node.

Organized data structure 408 defines dependency relationships between the elements. In the example using a tree, leaves of a same node have the least certainty of being independent, while leaves, which share a grandparent node, are somewhat more certain. Information is further stored in organized data structure 408 enabling each node to provide all the leaves below the node in the order in which leaves appeared in the original stream, regardless of how the leaves are grouped in the tree.

Tree building methods are typically known and placing items into the tree would likely use external insight into the stream and contents. In one example, for a given stream of data a tree would always have a specific depth. In another example, a tree building process may also determine an appropriate depth of the tree based on the elements identified in the stream. When a sufficient number of items have been placed into the tree, processing can occur for this unit of work. A sufficient number may be realized as a predetermined representation of the input data stream using a number of suitable methods including a number of elements processed, a number of elements of a specific type processed, a percentage of the input data stream processed or a quantity of storage space utilized.

Figure 5:
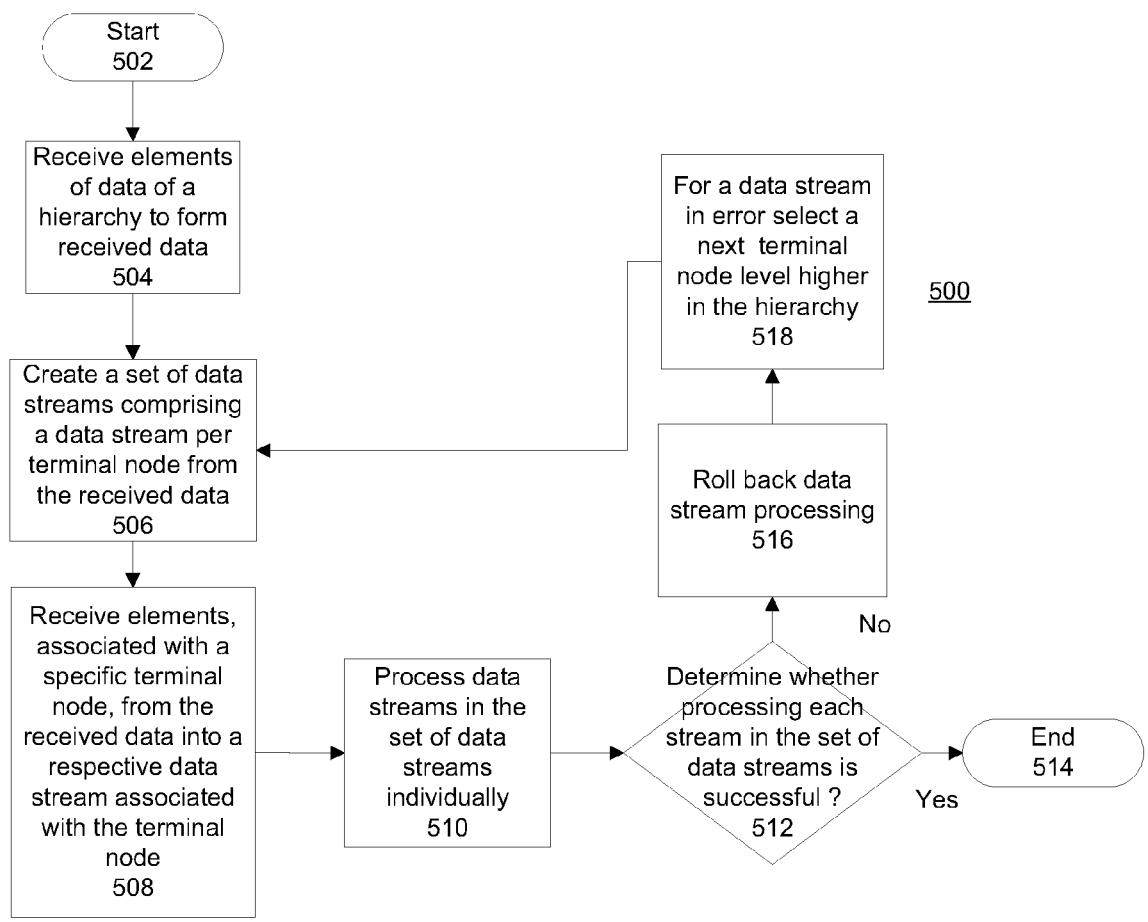
FIG. 5 is a flowchart of a data stream process using the stream processing system of FIG. 3, in accordance with one embodiment of the invention.

With reference to FIG. 5, a flowchart of a data stream process using stream-processing system 300 of FIG. 3, in accordance with one embodiment of the invention is presented. Data stream process 500 is an example of processing a data stream using stream-processing system 300 of FIG. 3 and input from process 400 of FIG. 4. The term elements or items may be used interchangeably to refer to objects within the data stream.

When determining dependency relationships between items in a data stream various levels of uncertainty may exist. While there may be a very high level of certainty item 11 is independent of item 9, there may be much less certainty item 11 is independent of item 8. Data stream process 500 enables specification of varying levels of uncertainty about dependency inherent in an organized data structure, for example the data structure created using process 400 of FIG. 4, to be used.

Processing of the data stream can first be attempted at a level of least certainty to take advantage of the most possible parallelism. When processing fails, because dependent items are processed in different streams, processing can be retried utilizing only relationships, which are more certain (higher node level in the hierarchy but allowing for a corresponding reduced amount of parallelism). The process is iterated, as necessary, until the stream of data has been processed successfully.

Process 500 begins (step 502) and receives elements of data of a hierarchy to form received data (step 504). As stated previously using the example of the organized data structure, elements of the data stream are in an ordered hierarchy, for example, an ordered tree structure. The tree structure of the organized data structure provides a series of nodes, sub-nodes and leaves in which dependency information associated with the elements or items is typically maintained implicitly (by relative position) or explicitly (for example, metadata, tags, or descriptors)

Process 500 creates a set of data streams comprising a data stream per terminal node from the received data (step 506). For example, in a first attempt, a separate processing stream is created for each of the terminal nodes (nodes which have leaves as children) identified in the input data received. Process 500 receives elements, associated with a specific terminal node, from the received data into a respective data stream associated with the terminal node (step 508). For example, the leaves from each terminal node are sent to an appropriate stream in parallel. The first set of terminal nodes at a lowest level in a hierarchy is referred to as T nodes, with higher terminal nodes referred to as T-n nodes, in which n designates a level number above the lowest. A root level is the highest level of the hierarchy.

Process 500 processes data streams in the set of data streams individually (step 510). While each stream is processed individually any number of streams in the set of streams may be processed in parallel. Parallel processing is typically used to reduce time required to process the complete data stream from which the set of streams was created.

Process 500 determines whether processing of a stream in the set of data streams is successful (step 512). A determination is performed for each stream processed. When a determination is made that all work completes without any of the processing reporting a dependency error, a unit of work is considered complete or successful, and a "yes" result is obtained in step 512 and process 500 terminates controlling processing (step 514).

When a determination is made that work completes with the processing reporting a dependency error a "no" result is obtained in step 512 and the unit of work is considered incomplete or not successful. For example, a cross-stream dependency involves two streams in which a dependency error occurs; a determination of the dependency error results in either stream or both streams reporting a dependency error. When a "no" result is obtained, process 500 rolls back processing for the unit of work (step 516). Rolling back processing causes the unit of work to be restored as before processing occurred and all streams to be reset.

Process 500 selects a next terminal node level higher in the hierarchy for a stream reporting an error (step 518). Optionally some or all streams that did not detect an error may be reset using a higher node level as well. In the current example using the ordered tree, processing streams are created in which the stream reporting an error is created using a T−1 node (node whose children are all terminal nodes) repeating step 506 as before. In parallel, the leaves of the T−1 nodes are sent to each appropriate stream in an order in which the leaves appeared in the original stream, as in process step 508 before.

When no dependency error is reported processing is successful and the unit of work can be considered complete. However when a dependency error is reported all processing of the unit of work is rolled back and process 500 iterates using higher-level T−2 nodes. Iteration continues as necessary until the root node is reached. At that point a single stream is used for processing and items are delivered in original order therefore no dependency error occurs.

A compromise between parallelism and timeliness may be made in which a risk assessment determines whether to maximize parallel processing. Maximizing parallelism requires the iterative processing of streams to resolve all dependency errors. When maximum parallelism is not required, a lesser amount of parallel stream processing may suffice which foregoes the resetting iteration of all streams reporting a dependency error. A predetermined proportion of parallelism may be defined in a configuration setting or provided dynamically in a request initializing the sampling tool.

Thus is presented, in an illustrative embodiment, a computer-implemented process for controlling processing of a data stream employing utilization of uncertainty dependency relationships receives elements of data of a hierarchy to form received data, wherein each element has associated dependency information, creates a set of data streams, receives elements, associated with a specific terminal node, from the received data into a respective data stream associated with the terminal node, processing data streams in the set of data streams individually using the associated dependency information and determining whether processing of a stream in the set of data streams is successful. Responsive to a determination processing of each stream in the set of data streams is successful, having no dependency errors reported; the computer-implemented process terminates controlling processing.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of media actually used to carry out the distribution. Examples of computer readable media include a floppy disk, a hard disk drive, a RAM, CD-ROMs, and DVD-ROMs. A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method for controlling processing of a data stream employing utilization of uncertain dependency relationships, the computer-implemented method comprising:

receiving elements of data of a hierarchy to form received data, wherein each element has associated dependency information;

creating a set of data streams, wherein the set comprises a plurality of data streams corresponding to a plurality of terminal sub-hierarchies of the hierarchy, each of the terminal sub-hierarchies being associated with one or more of the elements of the data;

for each of the sub-hierarchies, passing elements of the data associated with that terminal sub-hierarchy into the data stream corresponding to that terminal sub-hierarchy;

processing data streams in the set of data streams individually using the associated dependency information;

determining whether processing of a stream in the set of data streams is successful; and responsive to a determination that processing each stream in the set of data streams is successful, terminating controlling processing.

2. The computer-implemented method of claim 1 wherein receiving elements of data of a hierarchy to form received data further comprises:

receiving organized data structure elements of a data stream of an ordered hierarchy, including an ordered tree structure, wherein the ordered tree structure of the organized data structure provides a series of nodes, sub-nodes and leaves in which the dependency information associated with the elements is maintained implicitly or explicitly or both.

3. The computer-implemented method of claim 1 wherein creating a set of data streams further comprises:

creating a data stream per terminal sub-hierarchy from the received data.

4. The computer-implemented method of claim 1 wherein responsive to a determination processing of a stream in the set of data streams is not successful comprises: rolling back data stream processing;

selecting a next terminal sub-hierarchy level higher in the hierarchy for each data stream in error;

and creating a set of data streams, wherein each data stream in error is reset using the next terminal sub-hierarchy level.

5. The computer-implemented method of claim 1 wherein processing data streams in the set of data streams individually further comprises:

processing each stream in the set of streams in parallel.

6. The computer-implemented method of claim 4 wherein creating a set of data streams further comprises:

determining whether a predetermined threshold of parallelism is met;

responsive to a predetermined threshold of parallelism being met foregoing additional parallelism for the set of data streams.

7. The computer-implemented method of claim 1 wherein determining whether processing of a stream in the set of data streams is successful further comprises: obtaining the dependency information associated with the elements; and determining whether all work completes absent reporting a dependency error, using the dependency information.

8. A computer program product for controlling processing of a data stream employing utilization of uncertain dependency relationships, the computer program product comprising:

a computer readable storage memory containing computer executable program code stored thereon, the computer executable program code comprising:

computer executable program code for receiving elements of data of a hierarchy to form received data, wherein each element has associated dependency information;

computer executable program code for creating a set of data streams, wherein the set comprises a plurality of data streams corresponding to a plurality of terminal sub-hierarchies of the hierarchy, each of the terminal sub-hierarchies being associated with one or more of the elements of the data;

computer executable program code for, performing for each of the sub-hierarchies, passing elements of the data associated with that terminal sub-hierarchy into the data stream corresponding to that terminal sub-hierarchy;

computer executable program code for processing data streams, in the set of data streams, individually using the associated dependency information;

computer executable program code for determining whether processing of a stream in the set of data streams is successful; and computer executable program code, responsive to a determination that processing of each stream in the set of data streams is successful, for terminating controlling processing.

9. The computer program product of claim 8 wherein computer executable program code for receiving elements of data in a hierarchy to form received data further comprises:

computer executable program code for receiving organized data structure elements of a data stream of an ordered hierarchy, including an ordered tree structure, wherein the ordered tree structure of the organized data structure provides a series of nodes, sub-nodes and leaves in which dependency information associated with the elements is maintained implicitly or explicitly or both.

10. The computer program product of claim 8 wherein computer executable program code for creating a set of data streams further comprises:

computer executable program code for creating a data stream per terminal sub-hierarchy from the received data.

11. The computer program product of claim 8 wherein computer executable program code responsive to a determination processing of a stream in the set of data streams is not successful comprises:

computer executable program code for rolling back data stream processing;

computer executable program code for selecting a next terminal sub-hierarchy level higher in the hierarchy for each data stream in error; and computer executable program code for creating a set of data streams wherein each stream in error is reset using the next terminal sub-hierarchy level.

12. The computer program product of claim 8 wherein computer executable program code for processing data streams in the set of data streams individually further comprises:

computer executable program code for processing each stream in the set of streams in parallel.

13. The computer program product of claim 11 wherein computer executable program code for creating a set of data streams further comprises:

computer executable program code for determining whether a predetermined threshold of parallelism is met;

computer executable program code responsive to a predetermined threshold of parallelism being met for foregoing additional parallelism for the set of data streams.

14. The computer program product of claim 8 wherein computer executable program code for determining whether processing of a stream in the set of data streams is successful further comprises:

computer executable program code for obtaining dependency information associated with the elements; and computer executable program code for determining whether all work completes, absent reporting a dependency error, using the dependency information.

15. A computer system for controlling processing of a data stream employing utilization of uncertain dependency relationships, the system comprising:

a memory that contains computer executable program code;

a processor unit connected to the memory, wherein the processor unit executes the computer executable program code to direct the system to:

receive elements of data of a hierarchy to form received data, wherein each element has associated dependency information;

create a set of data streams, wherein the set comprises a plurality of data streams corresponding to a plurality of terminal sub-hierarchies of the hierarchy, each of the terminal sub-hierarchies being associated with one or more of the elements of the data;

for each of the sub-hierarchies, pass elements of the data associated with that terminal sub-hierarchy into the data stream corresponding to that terminal sub-hierarchy;

process data streams in the set of data streams individually using the associated dependency information;

determine whether processing of a stream in the set of data streams is successful; and responsive to a determination that processing of each stream in the set of data streams is successful, terminate controlling processing.

16. The computer system of claim 15 wherein the processor unit executes the computer executable program code to receive elements of data of a hierarchy to form received data further directs the system to:

receive organized data structure elements of a data stream in an ordered hierarchy, including an ordered tree structure, wherein the ordered tree structure of the organized data structure provides a series of nodes, sub-nodes and leaves in which the dependency information associated with the elements is maintained by one of implicitly and explicitly or both.

17. The computer system of claim 15 wherein the processor unit executes the computer executable program code to create a set of data streams further directs the system to:

create a data stream per terminal sub-hierarchy from the received data.

18. The computer system of claim 15 wherein the processor unit executes the computer executable program code responsive to a determination processing of a stream in the set of data streams is not successful further directs the system to:

roll back data stream processing;

select a next terminal sub-hierarchy level higher in the hierarchy for each data stream in error; and create a set of data streams wherein each data stream in error is reset using the next terminal sub-hierarchy level.

19. The computer system of claim 18 wherein the processor unit executes the computer executable program code to process data streams in the set of data streams individually further directs the system to:

process each stream in the set of streams in parallel, wherein creating a set of data streams further comprises:

determining whether a predetermined threshold of parallelism is met; and responsive to a predetermined threshold of parallelism being met foregoing additional parallelism for the set of data streams.

20. The computer system of claim 15 wherein the processor unit executes the computer executable program code to determine whether processing of a stream in the set of data streams is successful further directs the system to:

obtain the dependency information associated with the elements; and determine whether all work completes absent reporting a dependency error, using the dependency information.

* * * * *